United States Patent
Yoshida et al.

(10) Patent No.: US 9,468,228 B2
(45) Date of Patent: Oct. 18, 2016

(54) PROCESS FOR MAKING BUNCHY FRESH NOODLES

(71) Applicant: NISSIN FOODS HOLDINGS CO., LTD., Osaka (JP)

(72) Inventors: Kunihiko Yoshida, Osaka (JP); Yoshifumi Miyazaki, Osaka (JP); Mitsuru Tanaka, Osaka (JP)

(73) Assignee: NISSIN FOODS HOLDINGS CO., LTD., Osaka (JP)

( * ) Notice: Subject to any disclaimer, the term of this patent is extended or adjusted under 35 U.S.C. 154(b) by 13 days.

(21) Appl. No.: 13/951,452

(22) Filed: Jul. 25, 2013

(65) Prior Publication Data
US 2014/0030406 A1 Jan. 30, 2014

Related U.S. Application Data

(62) Division of application No. 12/996,275, filed as application No. PCT/JP2009/004851 on Sep. 25, 2009.

(30) Foreign Application Priority Data

Feb. 19, 2009 (JP) .................................. 2009-037077

(51) Int. Cl.
A23L 1/16 (2006.01)
A23L 1/162 (2006.01)

(52) U.S. Cl.
CPC . *A23L 1/162* (2013.01); *A23L 1/16* (2013.01)

(58) Field of Classification Search
USPC ........................................................ 426/557
See application file for complete search history.

(56) References Cited

U.S. PATENT DOCUMENTS

| 3,892,874 A | 7/1975 | Ando |
| 4,988,528 A | 1/1991 | Tomoda |
| 5,151,289 A | 9/1992 | Ozawa et al. |
| 5,759,608 A | 6/1998 | Momiyama |

FOREIGN PATENT DOCUMENTS

| JP | 35013645 | * 9/1960 |
| JP | S 35-013645 | 9/1960 |

(Continued)

OTHER PUBLICATIONS

Supplementary European Search Report issued in European Patent Application No. 09840292.8 dated Jun. 20, 2012.

(Continued)

*Primary Examiner* — Lien T Tran
(74) *Attorney, Agent, or Firm* — McDermott Will & Emery LLP

(57) ABSTRACT

Provided is a bundle of fresh noodles which become less-wavy, straight noodles when the instant noodles are cooked with hot water, while maintaining an existing manufacturing line as much as possible. The noodle strings are stacked on a conveyor such that adjacent noodle strings are in a non-parallel state and each noodle string bends to have a substantially spiral shape. The plurality of noodle strings are arranged to overlap one another and form a substantially flat bundle of noodle strings. Each of the noodle strings forming fresh noodles bends and repeatedly forms loops on the conveyor. The loops are arranged to be sequentially shifted in a direction opposite a conveyance direction of the conveyor.

4 Claims, 13 Drawing Sheets

(56) References Cited

FOREIGN PATENT DOCUMENTS

| JP | S 50-67185 | | 6/1975 |
|---|---|---|---|
| JP | 59-220161 | | 12/1984 |
| JP | 01-095719 | | 4/1989 |
| JP | H04-038714 Y2 | | 9/1992 |
| JP | 210924 | * | 11/1998 |
| JP | 2000-189089 | | 7/2000 |
| KR | 0175155 | | 2/1999 |
| KR | 2002-0039167 | | 5/2002 |
| KR | 10-0710783 | | 4/2007 |

OTHER PUBLICATIONS

English Translation of International Search Report issued in International Patent Application No. PCT/JP2009/004851, mailed Nov. 2, 2009.

Japanese Food Newspaper "Bin-soba: Noodles going down a throat smoothly" p. 2, Sep. 12, 2008.

Japanese Food Newspaper "Nissin Donbei Kitnue-soba: Adoption of straight-noodles" p. 8, Oct. 8, 2008.

Convenience vol. 11. No. 12, pp. 62-64 2008.

Japanese Food Newspaper "Donbei: Introduction of Two Liquid Soups" p. 10, Dec. 12, 2008.

Explanation of Reason for Accelerated Examination Feb. 25, 2009.

The Good Housekeeping "Step by Step Cookbook," 1997, p. 350.

Office Action issued in U.S. Appl. No. 12/996,275 dated Sep. 16, 2011.

Office Action issued in U.S. Appl. No. 12/996,275 dated Feb. 10, 2012.

Office Action Issued in U.S. Appl. No. 12/996,275 dated Aug. 15, 2012.

Office Action issued in U.S. Appl. No. 12/996,275 dated Feb. 5, 2013.

* cited by examiner (a)　　　　　　　(b)

(a)   (b)   (c)

(a)   (b)   (c)   (d)

PROCESS FOR MAKING BUNCHY FRESH NOODLES

RELATED APPLICATIONS

This application is a Divisional of U.S. patent application Ser. No. 12/996,275, filed on Dec. 3, 2010 Now Pending, which is the U.S. National Phase under 35 U.S.C. §371 of International Application No. PCT/JP2009/004851, filed on Sep. 25, 2009, which in turn claims the benefit of Japanese Application No. 2009-037077, filed on Feb. 19, 2009, the entire contents of each of which are hereby incorporated by reference.

TECHNICAL FIELD

The present invention relates to a bundle of fresh noodles which is used as instant noodles and is produced such that in a case where the instant noodles using the fresh noodles as their ingredients are cooked with hot water, each of noodle strings does not form a wave shape. The present invention also relates to a method for producing instant noodles produced such that in a case where the instant noodles are cooked with hot water, each of noodle strings does not form a wave shape.

BACKGROUND ART

A common method for producing noodles basically includes the steps of: mixing and kneading noodle ingredients, such as flour and starch, to form a noodle dough; rolling out the noodle dough to form a noodle belt having a predetermined thickness; and cutting the noodle belt with a noodle string cutting device into linear noodle strings each having a predetermined thickness to produce fresh noodle strings. Then, the fresh noodle strings are subjected to a necessary process step, such as a cutting process or a steam-boiling process, depending on the form of an end product, such as fresh noodles, dried noodles, steamed noodles, or instant noodles.

In the case of the steamed noodles and the instant noodles, the steam-boiling process almost always needs to be carried out after cutting the noodle dough into the noodle strings. The noodle string cutting device and a steam-boiling device are arranged with a noodle string conveyor interposed therebetween, so that these steps are consecutively carried out. Thus, the conveyance of the noodles is automated.

The noodle string cutting device used for conventional instant noodles produces desired bent noodles as follows: a pair of cutting blade rolls are provided horizontally or provided so as to be suitably inclined with respect to each other; guide tubes are provided just under the cutting blade rolls so as to extend in a vertical direction or to be inclined backwardly with respect to a proceeding direction of the noodle string conveyor; the cut noodle strings are caused to slightly get stuck in the guide tubes to be bent; and the bent noodle strings are guided to the conveyor disposed under the guide tubes; and the noodle strings each having a bent shape (wave shape) are moved to the steam-boiling device (see Patent Document 1 for example).

Also known is a noodle shape forming device configured such that the cut noodle strings are swung by a roller (tubular body), and the noodles each having an arbitrary wave shape are mounted on the conveyor (see Patent Document 2).

In order to industrially mass-produce the instant noodles and reduce costs, such as a land cost, it is ideal to reduce a manufacturing line as short as possible and reduce an installation space. Here, since the noodle strings are caused to slightly get stuck in the guide tubes to each form the wave shape as above, the noodle strings are densely stacked on the conveyor. Therefore, a physical length of the manufacturing line can be shortened. In this case, the cut speed of the noodle string coming out from the cutting blade is lower than the speed of the conveyor. In recent years, consumer preferences are becoming diversified, and there is an increasing demand for instant noodles that are so-called "straight noodles" whose noodle strings are less wavy and substantially linear. Known examples of a method for producing straight noodle strings having no wave shapes are a method for setting the speed of the conveyor to be close to the cut speed of the noodle string coming out from the cutting blade and a method for cutting the noodle strings hanging from the cutting blade in a vertically downward direction and moving the noodle strings to the next step.

CITATION LIST

Patent Literature

Patent Document 1: Japanese Examined Utility Model Application Publication No. 4-38714
Patent Document 2: Japanese Examined Patent Application Publication No. 36-24040

SUMMARY OF INVENTION

Technical Problem

Among the above-described conventional methods for causing the noodle strings to be a substantially straight noodles, the method for setting the speed of the conveyor to be close to the cut speed of the noodle string requires a long manufacturing line in light of mass production. As a result, the installation space increases. Moreover, in accordance with the method for cutting the noodle strings hanging from the cutting blade in the vertically downward direction, subsequent processes, such as gelatinization, become complex.

Moreover, the noodle shape forming device of Patent Document 2 is a device configured to form the shapes of the noodles such that the noodles can be entirely and easily heated and is not a device configured to straighten the noodle strings in the mass production.

An object of the present invention is to provide a method for producing instant noodles which become less-wavy, straight noodles when the instant noodles are cooked with boiling water, while maintaining an existing manufacturing line as much as possible. Another object of the present invention is to provide a bundle of fresh noodles useful as ingredient noodles of the instant noodles without using any special additive.

In the following explanation, the "straight noodles" denote noodles whose noodle strings cooked with boiling water (noodle strings ready to be eaten) are less wavy and substantially straight in a case where the noodle strings are picked up with chopsticks, a fork, or the like.

Solution to Problem

The present inventors have studied a method for producing the straight noodles while maintaining a conventional line length as much as possible. In order to utilize an existing instant noodle manufacturing line without changing the line as much as possible, the present inventors have focused attention on a method for physically pulling the steamed noodle strings to straighten the noodle strings. However, in the case of the wavy noodle strings prepared from the noodle dough by the conventional producing method, even if the noodle strings are pulled after the gelatinization of a steaming step (steam-boiling step), the waves are strong. Therefore, no matter how the subsequent steps are adjusted, it is difficult to produce the instant noodles which become the straight noodles after the instant noodles are cooked with hot water.

Here, the present inventors have diligently studied and tested various cut conditions in a cutting step of cutting the noodle dough into the noodle strings to find out what type of noodle strings after cutting can become straight noodle strings before eating.

As a result of studies on various cut conditions, the present inventors have surprisingly found out that the case where the steamed noodle strings can be pulled to be straight is a case where the noodle strings after cutting are stacked on the conveyor such that each noodle string is not in parallel with an adjacent noodle string and bends to have a substantially spiral shape, and adjacent noodle strings on the conveyor do not have the same curved or bent shape as each other (to be specific, the flows of the adjacent noodle strings are not in synchronization with each other). The present inventors have found that in such a case, even if the noodle strings are stacked in a multilayered manner, the noodle strings can be straightened by stretching the noodle strings after steam-boiling. Thus, the present inventors have achieved the present invention.

Specifically, the present invention relates to bunchy fresh noodles used as instant noodles and forming a substantially flat bundle such that a plurality of noodle strings overlap one another, wherein: the fresh noodles are produced so as to be cut from a noodle dough and arranged on a conveyor in a conveyance direction of the conveyor; each of noodle strings forming the fresh noodles bends and repeatedly forms loops on the conveyor; the loops are arranged to be sequentially shifted in a direction opposite the conveyance direction of the conveyor; a trajectory of each noodle string is not in synchronization with a trajectory of the adjacent noodle string; each noodle string intersects with and overlaps the adjacent noodle string such that positions of the loops of each noodle string are shifted from positions of the loops of the adjacent noodle string; and the noodles strings overlapping one another are steam-boiled, stretched, cut, and dried, and as a result, the noodle strings cooked with hot water become substantially linear.

The present invention also relates to a method for producing instant noodles, including: an arranging step of causing a noodle dough to pass through a pair of cutting blade rolls to form a plurality of noodle strings, separating the noodle strings from the cutting blade rolls by a scraper, stacking the noodle strings on the conveyor such that adjacent noodle strings are in a non-parallel state and each noodle string bends to have a substantially spiral shape, and arranging the noodle strings as a flat bundle of noodle strings; a steam-boiling step of steam-boiling the noodle strings while maintaining states of the noodle strings after the arranging step; a stretching step of stretching the noodle strings in a certain direction after the steam-boiling step; a cutting step of cutting the noodle strings after the stretching step into pieces each having a certain length; and a drying step of drying the noodle strings after the cutting.

In the instant noodle producing method, a noodle dough produced by a conventional method is caused to pass through between a pair of cutting blade rolls each having a plurality of circular grooves to form a plurality of noodle strings. Next, the noodle strings are separated from the cutting blade rolls by the scraper, and the noodle strings therefore fall onto the conveyor. At this time, normally, swinging of the noodle strings falling onto the conveyor is suppressed using guide tubes to prevent the noodle strings from spreading on the conveyor.

In accordance with such conventional instant noodle producing method, the noodle strings are crammed on the conveyor, and strong waves are therefore given to the noodle strings. Such noodle strings are moved to the steam-boiling step by the conveyor to be steam-boiled. In this case, even if the noodle strings are stretched after the steam-boiling step, the waves of the noodle strings remain and the noodle strings do not become the straight noodles when the noodle strings are cooked with hot water to be eaten as the end product.

However, in accordance with the bunchy fresh noodles used as the instant noodles according to the present invention, since the noodle strings are stacked in a predetermined direction such that adjacent noodle strings are in the non-parallel state, and each noodle string bends to have the substantially spiral shape, the contact portions where the noodle strings contact each other are small. Moreover, in accordance with the bunchy fresh noodles used as the instant noodles according to the present invention, since the noodle strings are stacked on the conveyor such that adjacent noodle strings are in the non-parallel state, and each noodle string bends to have the substantially spiral shape, the contact portions where the noodle strings contact each other are small. The stacked noodle strings (bundle of noodle strings) are moved by the conveyor to the steam-boiling step to be steam-boiled. Next, the noodle strings are stretched and cut. Then, the noodle strings are dried or fried to obtain the end product. When this end product is cooked with hot water before eating, the noodle strings are neatly separated from each other and become the straight noodles.

Here, the "parallel state" described in the present application denotes a state where the flows of a plurality of adjacent noodle strings are in synchronization with one another, and the plurality of adjacent noodle strings therefore form a mass. In other words, the "parallel state" denotes a state where the plurality of adjacent noodle strings are stacked on the conveyor so as to be substantially the same in state as one another.

In contrast, the "non-parallel state" described in the present application denotes a state where the flows of a plurality of adjacent noodle strings are not in synchronization with one another but are independent, and an entire part or a certain part of the plurality of adjacent noodle strings is therefore in a random state so as not to form a mass.

A feature of the present invention in which the instant noodles cooked with hot water become the straight noodles without any special device or any additive is a unique effect which cannot be predicted by one skilled in the art from the conventional fresh noodles used as instant noodles, the conventional instant noodle producing methods, and combinations thereof.

Moreover, the "instant noodles" described in the present application are noodles which are cooked with hot water for a certain period of time to be eaten. Examples are soup types, such as ramens and wheat noodles, and non-soup types, such as fried noodles, cooked with hot water which is poured away after cooking.

In the arranging step, a plurality of bundles of noodle strings may be arranged on the conveyor. This is because by consecutively arranging the plurality of bundles of noodle strings, the mass production can be realized.

In the cutting step, the noodle string stretched in the stretching step to have a certain length is cut into pieces each having a predetermined length.

It is preferable that the drying step be a frying step of frying the noodle strings with oil.

The above object, other objects, features and advantages of the present invention will be made clear by the following detailed explanation of preferred embodiments with reference to the attached drawings.

Advantageous Effects of Invention

In accordance with bunchy fresh noodles used as the instant noodles according to the present invention, instant noodles which become straight noodles when the instant noodles are cooked with hot water can be mass-produced while utilizing a conventional manufacturing line and without cost or energy.

BRIEF DESCRIPTION OF DRAWINGS

FIG. 1(a) shows a method for producing conventional instant noodles such that the flows of the noodle strings are in synchronization with one another. FIG. 1(b) is a method for producing instant noodles of the present invention such that the flows of the noodle strings are not in synchronization with one another.

FIG. 7(a) shows the noodle string having a substantially spiral shape. FIG. 7(b) shows the noodle string produced such that adjacent loops thereof overlap each other. FIG. 7(c) shows the noodle string having a portion where spiral loops thereof are not constant in size.

FIG. 8(a) shows a state where the noodle strings each having the substantially spiral shape are stacked such that the flows thereof are in synchronization with each other. FIG. 8(b) shows a state where the noodle strings each having the substantially spiral shape are stacked so as to be out of phase with each other in a proceeding direction of the conveyor. FIG. 8(c) shows a state where the noodle strings each having the substantially spiral shape are stacked so as to be out of phase with each other in a direction perpendicular to the proceeding direction of the conveyor.

FIG. 8 (d) shows a state where the positions of the loops are different from each other in a direction diagonal with respect to the proceeding direction of the conveyor.

FIG. 12 is a photograph showing the noodle strings on the conveyor in the arranging step of Comparative Example.

FIG. 13 is a photograph showing the noodle strings on the conveyor in the arranging step of Comparative Example and taken at a different angle from that of FIG. 12.

DESCRIPTION OF EMBODIMENTS

An embodiment of the present invention will be suitably explained in reference to the drawings. However, the present invention is not limited to the following description.

(Arranging Step)

In an arranging step, first, noodle dough prepared by a conventional method is caused to pass through between a pair of cutting blade rolls to form a plurality of noodle strings. Next, the noodle strings and separating teeth of a scraper are caused to contact each other to separate the noodle strings from the cutting blade rolls. Thus, the noodle strings fall on the conveyor in operation.

Here, the state of the noodle string falling on the conveyor and the stack state of the noodle strings on the conveyor change depending on conditions, such as the cut speed of the noodle string, the speed of the conveyor, and positions where the noodle strings are separated from the cutting blade. Therefore, by adjusting these conditions, the noodle strings forming the stack state of the present invention can be obtained. One example of a specific cutting method will be explained below.

In accordance with a normal instant noodle producing method, the noodle strings separated from the cutting blade rolls moves into guide tubes, and swinging of the noodle strings is forcibly suppressed. Thus, strong wave shapes are given to the noodle strings. Therefore, even if the noodle strings are stretched after steam-boiling, the noodle strings do not become substantially straight.

Moreover, in a case where noodle strings separated from any adjacent grooves of the cutting blade fall on positions of the conveyor which are the same as each other in the proceeding direction (in a case where contact positions where the adjacent noodle strings and the separating teeth of the scraper contact are the same as each other in a circumferential direction of the cutting blade roll), the adjacent noodle strings fall closely. Therefore, in many cases, these noodle strings interfere with each other when falling. To be specific, as shown in FIG. 1(a), the noodle strings fall on the conveyor in synchronization with one another and overlap one another by planes and lines to form a stack body (the noodle strings forms the stack state of the abode-described "parallel state").

In contrast, in the present invention, it is preferable that the noodle strings fall onto the conveyor comparatively freely without using the guide tubes, and the positions of the noodle strings on the conveyor is different from one another in the proceeding direction of the conveyor. To be specific, it is preferable that the noodle strings separated from any adjacent grooves of the cutting blade are separated at positions of the conveyor which are different from each other in the proceeding direction of the conveyor (contact positions where the adjacent noodle strings and the separating teeth of the scraper contact are different from each other in the circumferential direction of the cutting blade roll).

Figure 1:
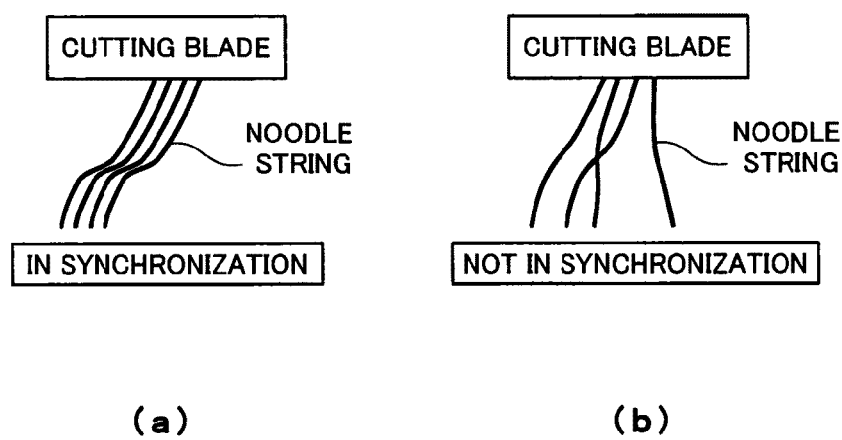
FIG. 1 are conceptual diagrams each showing states of noodle strings falling from a cutting blade roll onto a conveyor.

By cutting the noodle dough into the noodle strings as above, the noodle strings fall onto the conveyor so as not to be in synchronization with one another as shown in FIG. 1(b) while being bent to each have a substantially spiral shape. Thus, the stack body of the noodle strings of the present invention can be obtained (the noodle strings forms the stack state of the above-described "non-parallel state").

To obtain such stack state, the cutting blade roll may be any cutting blade roll, such as a square blade or a round blade.

As described above, it is preferable that a plurality of contact positions where the noodle strings and the separating teeth of the scraper contact be different from one another in the circumferential direction of the cutting blade roll. One scraper may be provided if the scraper has a plurality of separating teeth at a plurality of positions different from one another in the circumferential direction of the cutting blade roll.

Moreover, a plurality of scrapers may be respectively provided at positions different from one another in the circumferential direction of the cutting blade roll if each of the plurality of scrapers is a normal scraper having a plurality of separating teeth at a plurality of positions which are the same as one another in the circumferential direction of the cutting blade roll.

Figure 2:
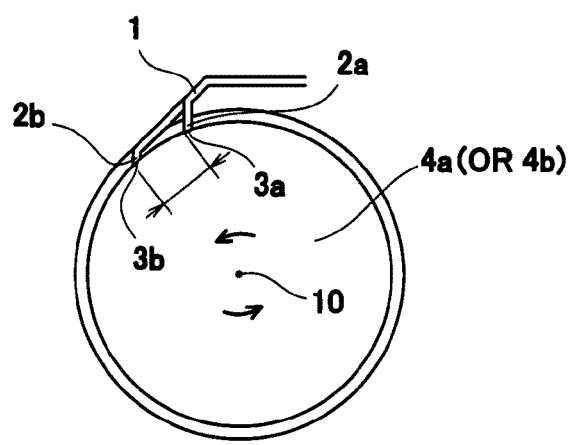
FIG. 2 is a conceptual diagram showing positions of separating teeth of a preferable scraper in an arranging step of the present invention.

Here, the phrase "different from one another in the circumferential direction of the cutting blade roll" denotes that as shown in FIG. 2, separating teeth 2a and 2b of a scraper 1 are located at different positions on an outer peripheral surface of a cutting blade roll 4a (or a cutting blade roll 4b). It is more preferable that a distance between a position of a tip end portion 3a of the separating teeth 2a and a rotational center 10 of the cutting blade roll 4a (or the cutting blade roll 4b) and a distance between a position of a tip end portion 3b of the separating teeth 2b and the rotational center 10 of the cutting blade roll 4a (or the cutting blade roll 4b) be different from each other. The number of the separating teeth of the scraper 1 is not limited to two but may be two or more. For example, the number of the separating teeth of the scraper 1 may be four or six.

In a case where one scraper has a plurality of separating teeth at a plurality of positions different from one another in the circumferential direction of the cutting blade roll, it is effective to alternately change the lengths of the separating teeth or to bend or curve the tip end portions of the separating teeth alternately.

It is necessary that the cut speed of the noodle string by the cutting blade roll be higher than the speed of the conveyor. More specifically, in a case where the cut speed of the noodle string is the same as the speed of the conveyor, the noodle strings on the conveyor become linear. In a case where the cut speed of the noodle string is higher than the speed of the conveyor, the noodle strings are arranged on the conveyor in a zigzag manner as shown by a broken line 7 in FIG. 3. In a case where the cut speed of the noodle string by the cutting blade roll is further higher than the speed of the conveyor, the noodle strings are arranged on the conveyor so as to each have the substantially spiral shape that is novel as shown by a solid line 8 in FIG. 3. Then, by consecutively stacking the noodle strings each having the substantially spiral shape, the stack body formed by overlapping the noodle strings each having the substantially spiral shape can be obtained.

It is preferable that the cut speed by the cutting blade roll be in a range from three times to twenty times the speed of the conveyor. In a case where the cut speed by the cutting blade roll is lower than three times the speed of the conveyor, the noodle strings are arranged to be substantially linear. In a case where the cut speed by the cutting blade roll exceeds twenty times the speed of the conveyor, the stack amount of the noodle strings may become too large, and steaming in a below-described steam-boiling step may become insufficient. To obtain the noodle strings each having the satisfactory substantially spiral shape, it is more preferable that the cut speed by the cutting blade roll be in a range from five times to ten times the speed of the conveyor.

Figure 3:
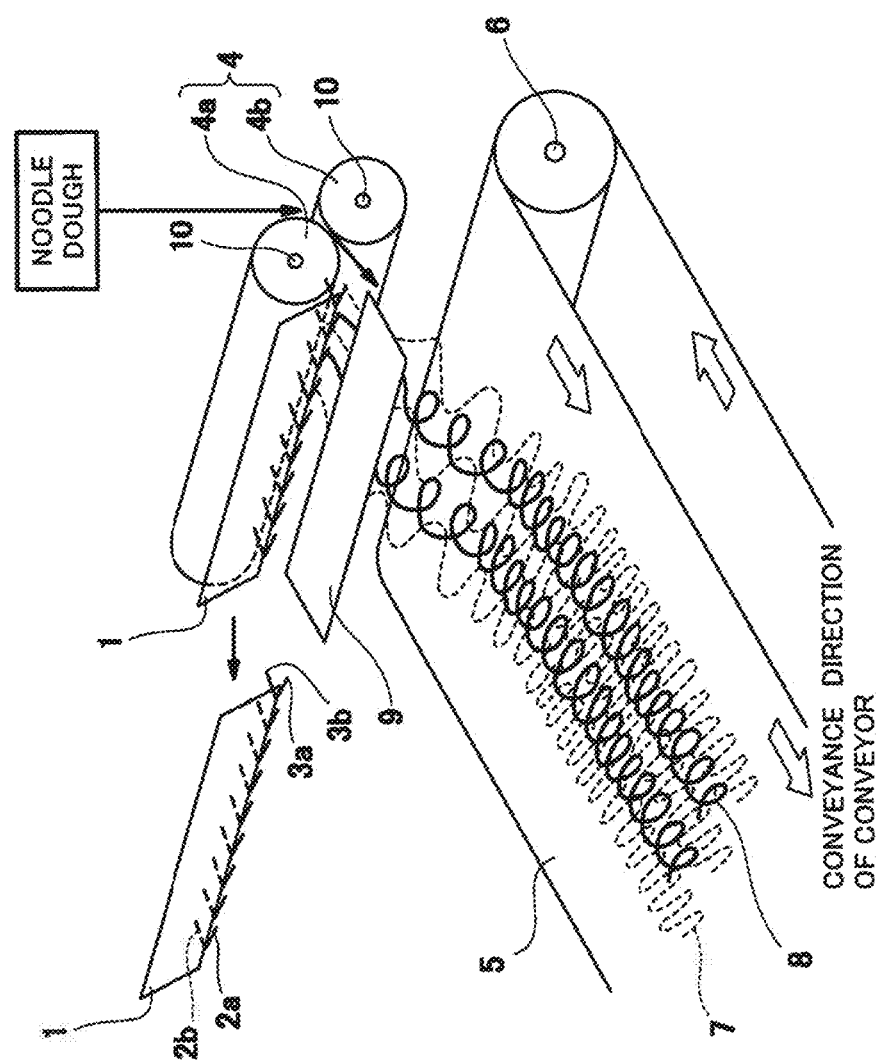
FIG. 3 is a conceptual diagram showing the periphery of the cutting blade roll in the arranging step of the present invention.

It is preferable that an upper plate (baffle plate) shown by reference number 9 in FIG. 3 be placed in the vicinity of an intermediate position between the pair of cutting blade rolls 4. In a case where the cut speed by the cutting blade roll is high, the noodle strings may leap high in a vertically upper direction. By providing the upper plate, such leaping power is suppressed and converted into a swinging power in a horizontally forward direction. Thus, the noodle strings fall onto the conveyor while forming a large spiral.

Figure 4:
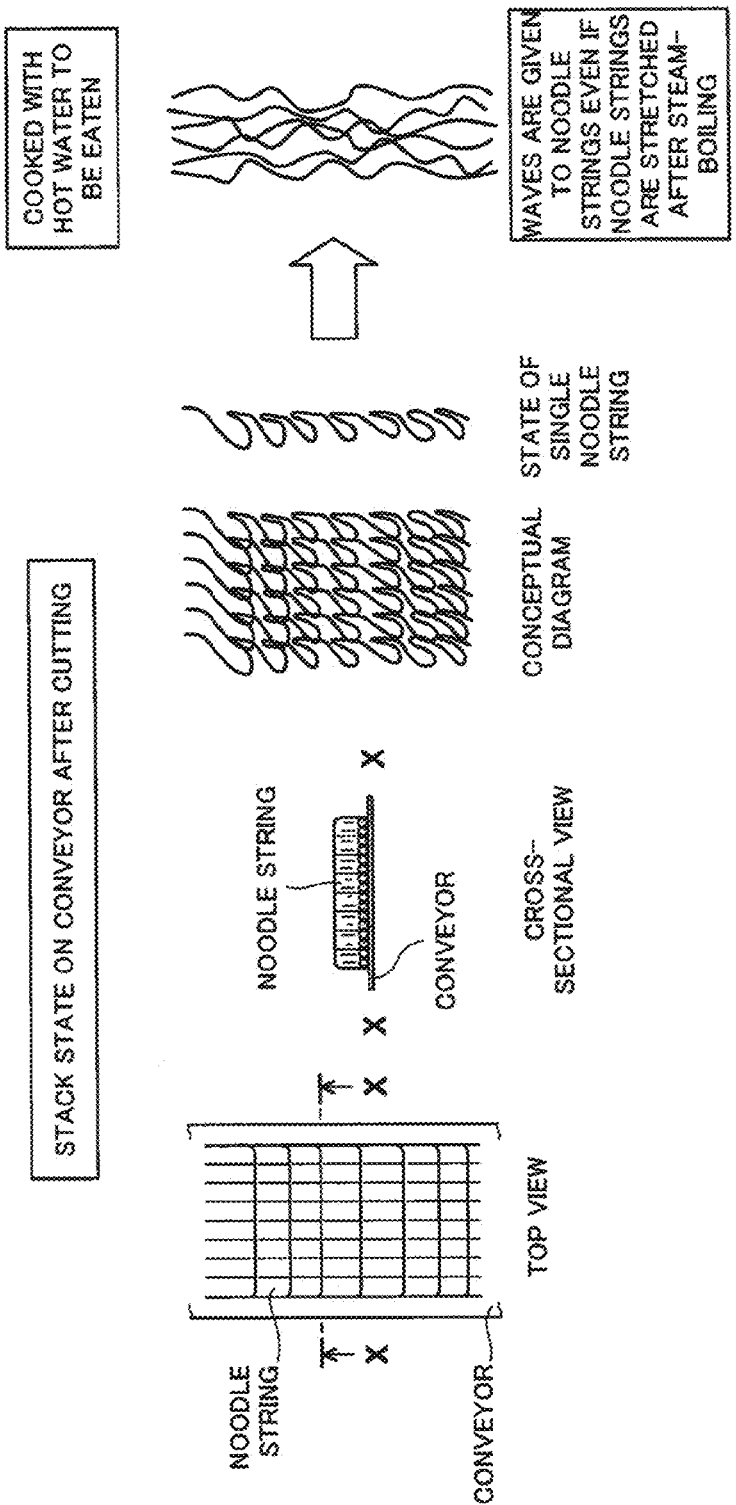
FIG. 4 is a conceptual diagram showing a stack state of the noodle strings on the conveyor in a conventional instant noodle producing method.
Figure 5:
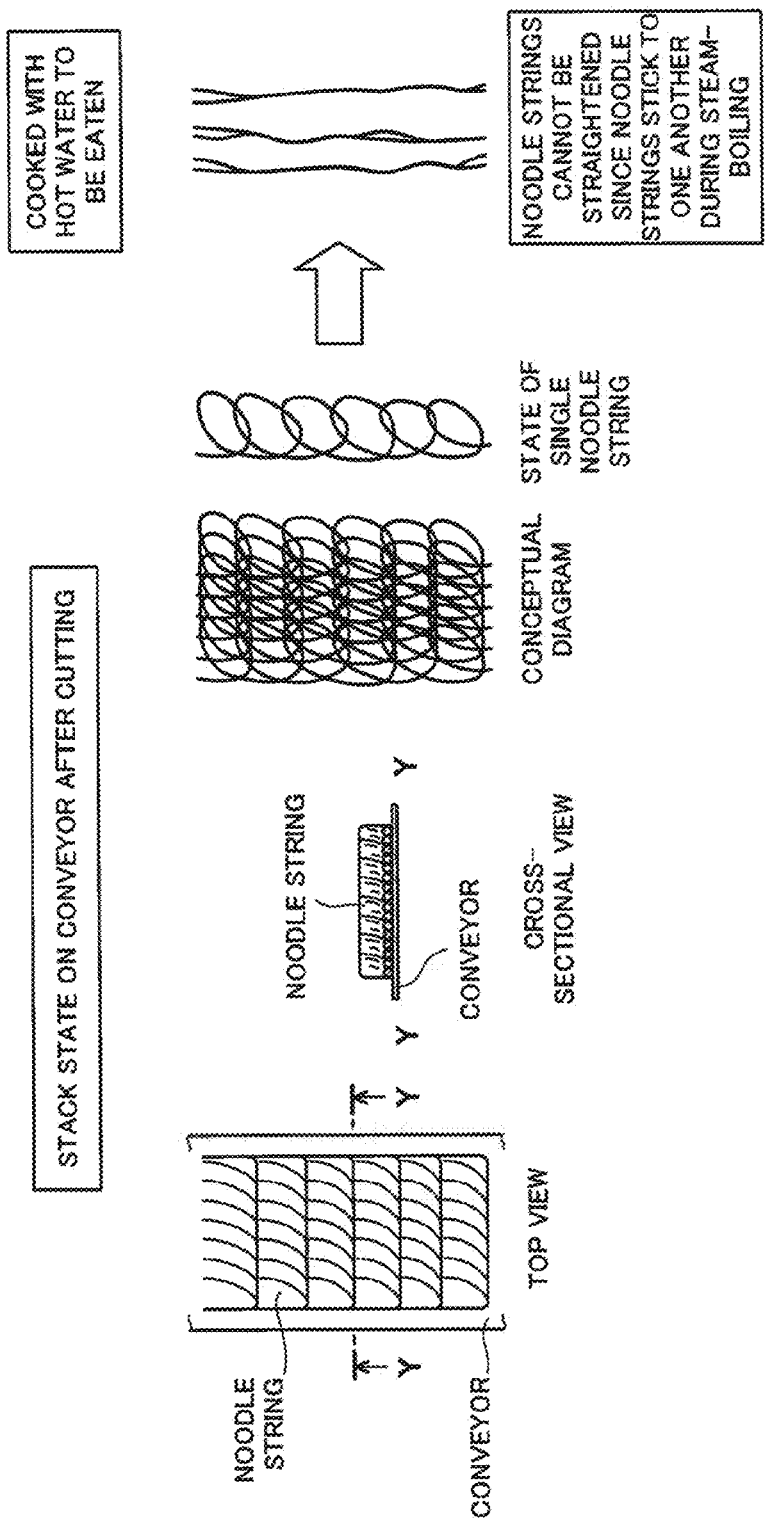
FIG. 5 is a conceptual diagram showing the stack state of the noodle strings on the conveyor in an instant noodle producing method of Comparative Example.
Figure 6:
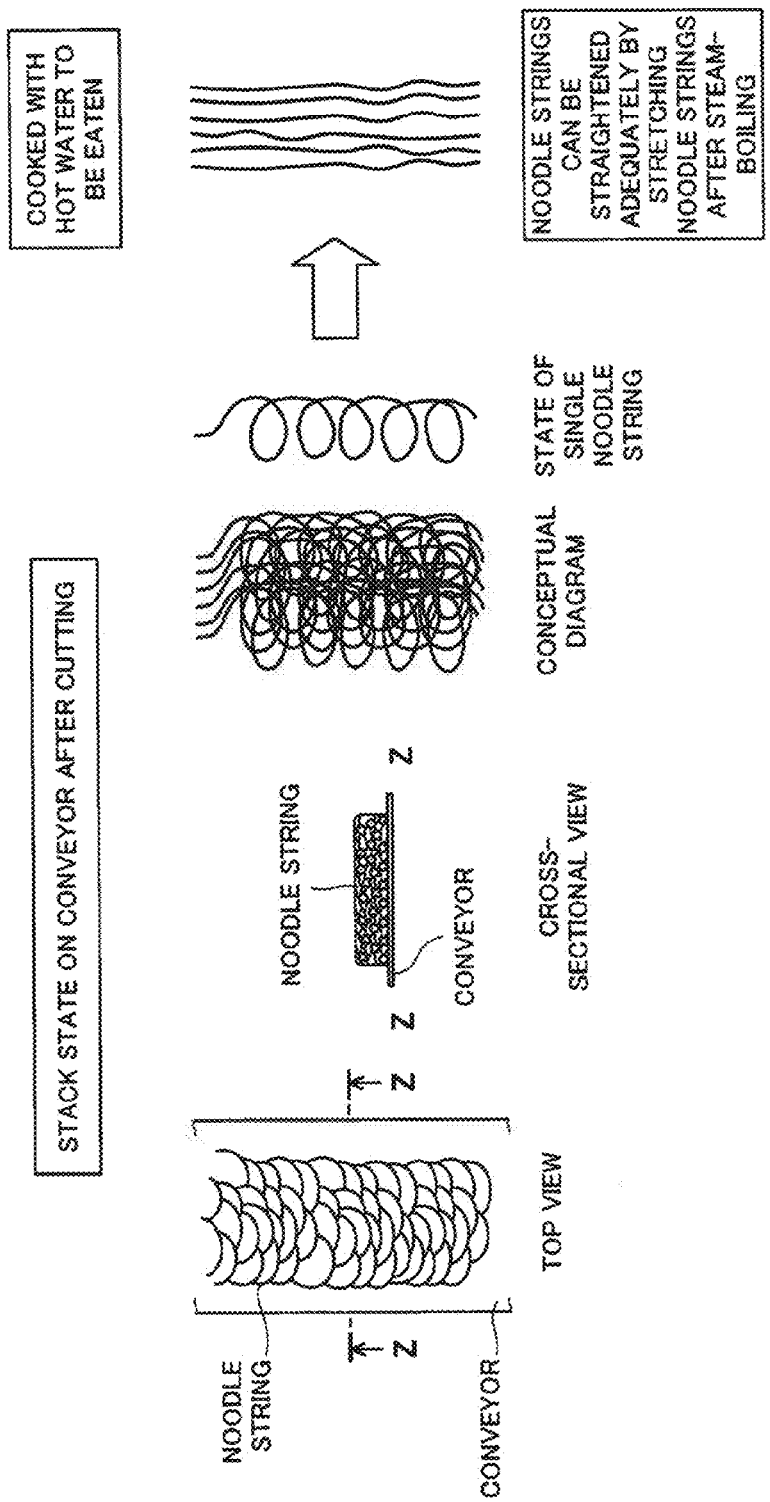
FIG. 6 is a conceptual diagram showing the stack state of the noodle strings on the conveyor in an instant noodle producing method of Example.

The state of each noodle string on the conveyor has been explained in reference to FIG. 3. Next, the stack state of the noodle strings on the conveyor will be explained based on FIGS. 4 to 6. In FIGS. 4 to 6 (except for respective cross-sectional views), the conveyor moves in a direction from an upper portion to a lower portion of each drawing.

As shown in FIG. 4, in accordance with the conventional instant noodle producing method, a plurality of noodle strings are stacked such that adjacent noodle strings are in the parallel state and linearly overlap each other in the proceeding direction of the conveyor. In FIG. 4, its top view shows the conveyor when viewed from immediately above the conveyor, its cross-sectional view is a view taken along line X-X of the top view, and its conceptual diagram shows the flows of the noodle strings on the conveyor. Definitions of the top view, the cross-sectional view, and the conceptual diagram in each of FIGS. 5 and 6 below are the same as those in FIG. 4 (the cross-sectional view of FIG. 5 is a view taken along line Y-Y of the top view of FIG. 5, and the cross-sectional view of FIG. 6 is a view taken along line Z-Z of the top view of FIG. 6).

In the state of FIG. 4, each noodle string has strong waves. Therefore, in a case where such noodle strings are moved by the conveyor to the steam-boiling step to be steam-boiled, the waves of the noodle strings remain even if the noodle strings are pulled in a certain direction in a stretching step. As a result, in a case where the instant noodles as an end product are cooked with hot water to be eaten, the waves of the noodle strings remain, and the instant noodles do not become the straight noodles. Note that FIG. 4 shows Conventional Example described below.

Next, the guide tubes used in the conventional producing method are removed, and the noodle strings falling on the conveyor are caused to swing. As shown in FIG. 5, the noodle strings on the conveyor at this time are stacked such that adjacent noodle strings are in the parallel state, curve, and overlap one another in the proceeding direction of the conveyor. In the state of FIG. 5, the overlapping of the noodle strings is stronger than that shown in FIG. 4. In a case where such noodle strings are moved by the conveyor to the steam-boiling step to be steam-boiled, the noodle strings stick to each other. Therefore, even if the noodle strings are pulled in a predetermined direction in the subsequent stretching step and cooked with hot water to be eaten as the instant noodle that is the end product, the noodle strings stick to each other. Note that FIG. 5 shows Comparative Example described below.

In contrast, as shown in FIG. 6, in accordance with the producing method of the present invention, the noodle strings each having the substantially spiral shape are randomly stacked such that adjacent noodle strings are in the non-parallel state. As is clear from a comparison between the top view and the cross-sectional view in FIG. 6, all the noodle strings are toppled, and this is significantly different from the stack state of the noodle strings of each of FIGS. 4 and 5.

A contact portion where the noodle strings contact each other is smaller than that in each of FIGS. 4 and 5. In a case where such noodle strings are moved by the conveyor to the steam-boiling step to be steam-boiled and are cooked with hot water to be eaten as the instant noodle that is the end product, the noodle strings do not stick to each other. Thus, the noodle strings become the straight noodles.

Not only the appearance of the straight noodles when the noodle strings cooked with hot water are picked up with chopsticks or the like but also the texture of the straight noodles is significantly different from that of the conventional instant noodles. Especially in the case of Japanese buckwheat noodles preferred by people due to its smooth "good feeling in the throat", a texture improvement effect obtained by the straight noodles is great.

Here, in the stack state of the noodle strings of the present invention shown in FIG. 6, it is unnecessary that each of all the noodle strings has the substantially spiral shape. A part of the noodle strings may have shapes other than the substantially spiral shape as long as the effects of the present invention can be obtained.

As compared to the stack state of the noodle strings shown in each of FIGS. 4 and 5, the noodle strings do not thickly contact one another in the stack state of the noodle strings of the present invention shown in FIG. 6. Therefore, if the other steam-boiling conditions are the same among FIGS. 4, 5, and 6, a time required to steam-boil the noodle strings becomes short in the present invention.

Figure 7:
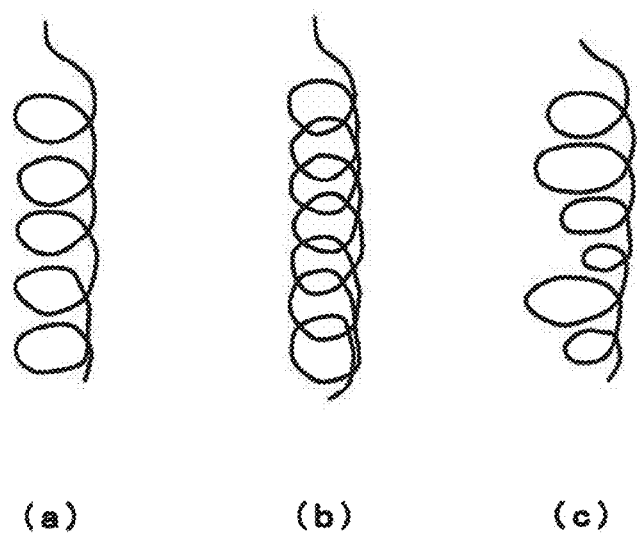
FIG. 7 are diagrams each showing the state of the noodle string of the present invention.

Here, the stack state of the noodle strings in the arranging step will be explained in more detail. In the present invention, it is preferable that each noodle string have the substantially spiral shape shown in FIG. 7(*a*). However, as shown in FIG. 7(*b*), each noodle string of the present invention may be formed such that adjacent loops thereof overlap each other. This is because in the stack state of the noodle strings, the contact portion where the noodle strings contact each other in the vertical direction can be further reduced. Moreover, as shown in FIG. 7(*c*), each noodle string of the present invention may have a portion where spiral loops thereof are different in size from one another.

FIG. 7 shows that all the spiral loops are located on the left side. However, the spiral loops may be located on the right side. Moreover, the spiral may be located on both sides. To be specific, the direction of the spiral is not limited.

Figure 8:
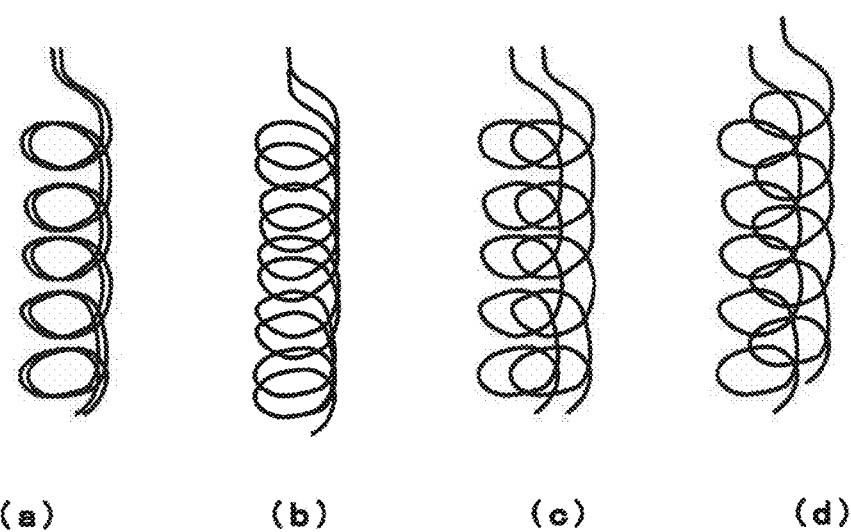
FIG. 8 are diagrams each showing the stack state of the noodle strings of the present invention.

The noodle strings each having the substantially spiral shape shown in FIGS. 7(*a*) to (*c*) are stacked such that the flows of the noodle strings are not in synchronization with one another. An explanation will be made using the spiral noodle string shown in FIG. 7(*a*) as an example. A plurality of noodle strings need to be stacked in the non-parallel state, not in the parallel state as shown in FIG. 8(*a*). In other words, it is necessary that the noodle strings each having the loops different in position from one another be stacked.

Specifically, it is necessary that the noodle strings need to be in the state of FIG. 8(*b*) in which the positions of the loops are different from each other in the proceeding direction of the conveyor, the state of FIG. 8(*c*) in which the positions of the loops are different from each other in a direction perpendicular to the proceeding direction of the conveyor, or the state of FIG. 8(*d*) in which the positions of the loops are different from each other in a direction diagonal with respect to the proceeding direction of the conveyor. Normally, if the flows of adjacent noodle strings are not in synchronization with each other when the noodle strings are separated from the cutting blade roll, the stack state shown in each of FIGS. 8(*b*) to 8(*d*) can be realized.

As long as the noodle strings are stacked in the stack state shown in each of FIGS. 8(*b*) to 8(*d*), about 10 to 16 layers of the noodle strings may be stacked on the conveyor in the vertical direction. The layers of the noodle strings may include a layer in which the noodle strings are complexly stacked, in addition to a layer in which the noodle strings are neatly stacked.

In accordance with the present invention, the noodle dough is continuously supplied to between the pair of cutting blade rolls, and a plurality of bundles of noodle strings are arranged on the conveyor. Thus, the instant noodles can be mass-produced.

To stabilize the states of the noodle strings stacked on the conveyor, it is preferable that a plurality of contact positions where the noodle strings and the separating teeth of the scraper contact be different from one another in the circumferential direction of the cutting blade roll, the noodle strings separated from the cutting blade roll fall on the conveyor without passing through the guide tubes, and the cut speed of the noodle string be higher than the speed of the conveyor.

(Steam-Boiling Step)

Next, the steam-boiling step will be explained. After the arranging step, the bundles of the noodle strings are moved as-is by the conveyor to the steam-boiling step. The steam-boiling step of the present invention is the same as the steam-boiling step of a normal instant noodle producing method except that the states of the noodle strings during the steam-boiling are different. For example, the normal steam-boiling is carried out at 100° C. for about one to two minutes. In this case, the noodle strings mounted on the conveyor can be continuously steam-boiled to be gelatinized.

(Stretching Step)

Next, the stretching step will be explained. After the steam-boiling step, the noodle strings are stretched in a certain direction to eliminate entanglements of the noodle strings and straighten the noodle strings in the stretching step. The stretching step of the present invention is substantially the same as the stretching step of the normal instant noodle producing method except that the states of the noodle strings before the stretching are different. For example, the bundles of the gelatinized noodle strings are straightened by a method for moving the noodle strings from the conveyor used in the steam-boiling to a conveyor which is higher in speed. It is preferable that the speed of the conveyor used for stretching the noodle strings be about the cut speed by the cutting blade roll.

The stretching may be carried out after the steam-boiled noodles are cooled down by water shower, wind, or the like. Moreover, depending on the combination of ingredients of the noodle, the noodle strings each having the substantially linear shape can be obtained only by stretching without cooling.

(Cutting Step)

It is preferable that after the stretching step, a cutting step of cutting the stretched noodle string into pieces each having a predetermined length be carried out. This is to adjust the amount of instant noodles as the end product to a constant amount. The cutting step herein is the same as the cutting step for the normal instant noodles, and a known cutting method can be utilized.

The steam-boiled noodles cut after the steam-boiling can be utilized as-is by wrapping the noodles. To be specific, the steam-boiled noodles are noodles which are distributed as a chilled product produced by steam-boiling the fresh noodles and cutting and packing the noodles. Since the steam-boiled noodles produced by the present invention are not wavy and are substantially straight, unique textures can be obtained. Therefore, the steam-boiled noodles of the present invention can be utilized as soup types, such as ramens and wheat noodles, and as non-soup types, such as fried noodles. In accordance with the present invention, the steam-boiled noodles having no waves can be continuously mass-produced.

(Drying Step)

To produce the instant noodles, a drying step of, for example, filling the noodle strings in a retainer to dry the noodle strings is carried out after the cutting step. As the drying step, known drying methods for producing so-called non-fried noodles may be used. For example, hot-air drying, freeze drying, or microwave drying may be used.

Moreover, another example of the drying method is fry drying. Specifically, the noodle strings may be fried using vegetable oil or animal oil as a frying step. In the frying step, known frying methods can be utilized.

As with the normal instant noodle producing method, seasoning and the like are suitably added to the noodles after the drying step or the frying step. Then, the noodles are filled in a container or the like, and the container is sealed. Thus, the noodles are supplied to the market as the instant noodle that is the end product.

EXAMPLE

Instant Chinese noodles were produced as Example of the present invention. First, the noodle dough was prepared using a mixer and a rolling machine. This noodle dough is the same as that of commercially available instant Chinese noodles.

(Arranging Step)

Next, the rolled-out noodle dough was supplied to a pair of cutting blade rolls each having a diameter of 3.7 cm and a width of 21.5 cm to form the noodle strings each having a diameter of 1.0 mm and a round cross section. The noodle strings fell on the conveyor without using the guide tubes. The cutting blade roll used herein was an 18th round blade. The scraper used herein was a scraper in which any two adjacent separating teeth were different in position from each other in the circumferential direction of the cutting blade roll. A falling speed (cut speed) of the noodle string was 1,000 cm/min. The speed of the conveyor was 170 cm/min. A distance between a contact portion where the pair of cutting blade rolls contact and the conveyor was 5 cm.

(Steam-Boiling Step)

After the arranging step, the noodle strings were supplied to a steam-boiling device while maintaining the states of the noodle strings when the arranging step was terminated. The noodle strings were subjected to the steam-boiling process at 100° C. for two minutes.

(Stretching Step)

After the steam-boiling step, the gelatinized noodle strings were stretched by the method for moving the noodle strings from the conveyor used in the steam-boiling to the conveyor which was higher in speed. Thus, the entanglements of the noodle strings were eliminated, and the noodle strings were straightened.

(Cutting Step)

Next, the linearly stretched noodle strings were cut into pieces each having a length of about 30 cm using a rotary roll cutter.

(Drying Step)

After the cutting step, the noodle strings were fried and dried at 150° C. for two minutes by the oil heat drying.

Conventional Example

The noodle strings of the fried noodles were produced in the same manner as Example except that in the arranging step, the swinging of the noodle strings immediately after the cutting was suppressed using the guide tubes, the waves were given to the noodle strings, and the noodle strings fell onto the conveyor. This is the normal instant noodle producing method.

Comparative Example

The noodle strings of the fried noodles were produced in the same manner as Example except that in the arranging step, any two adjacent separating teeth of the scraper were located at the same positions as each other in the circumferential direction of the cutting blade roll.

<States of Noodle Strings in Arranging Step>

Figure 9:
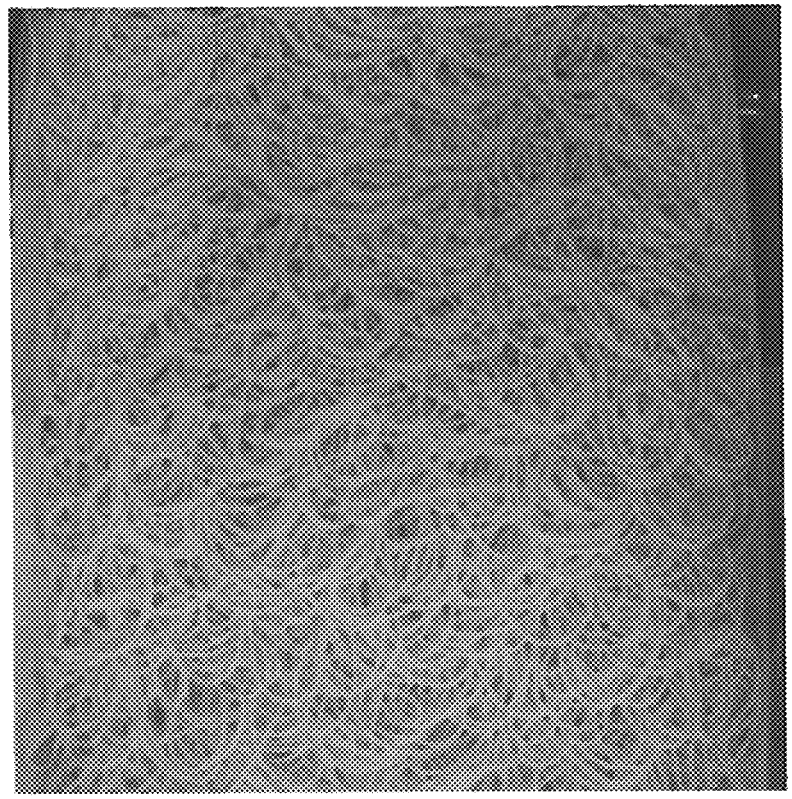
FIG. 9 is a photograph showing the noodle strings on the conveyor in the arranging step of Example.
Figure 10:
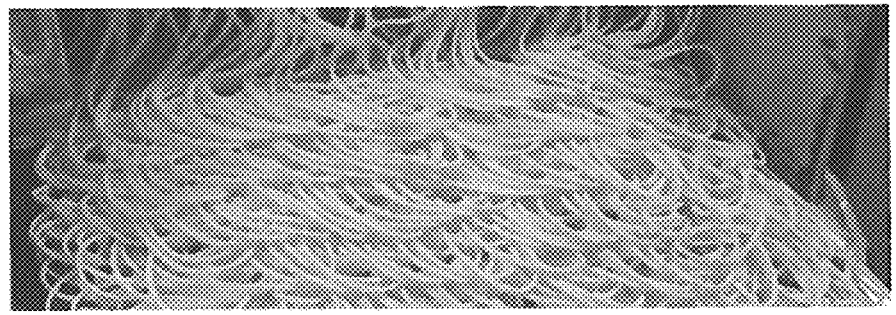
FIG. 10 is a photograph showing the noodle string on the conveyor in the arranging step of Example and taken at a different angle from that of FIG. 9.

First, the stack state of the noodle strings on the conveyor in the arranging step of Example is shown in each of FIGS. 9 and 10. In Example, each of the noodle strings on the conveyor has the substantially spiral shape, and adjacent noodle strings are in the non-parallel state. Moreover, the bundles of the noodle strings are in a random state, and a portion where the flows of adjacent noodle strings are in synchronization with each other is not confirmed.

Figure 11:
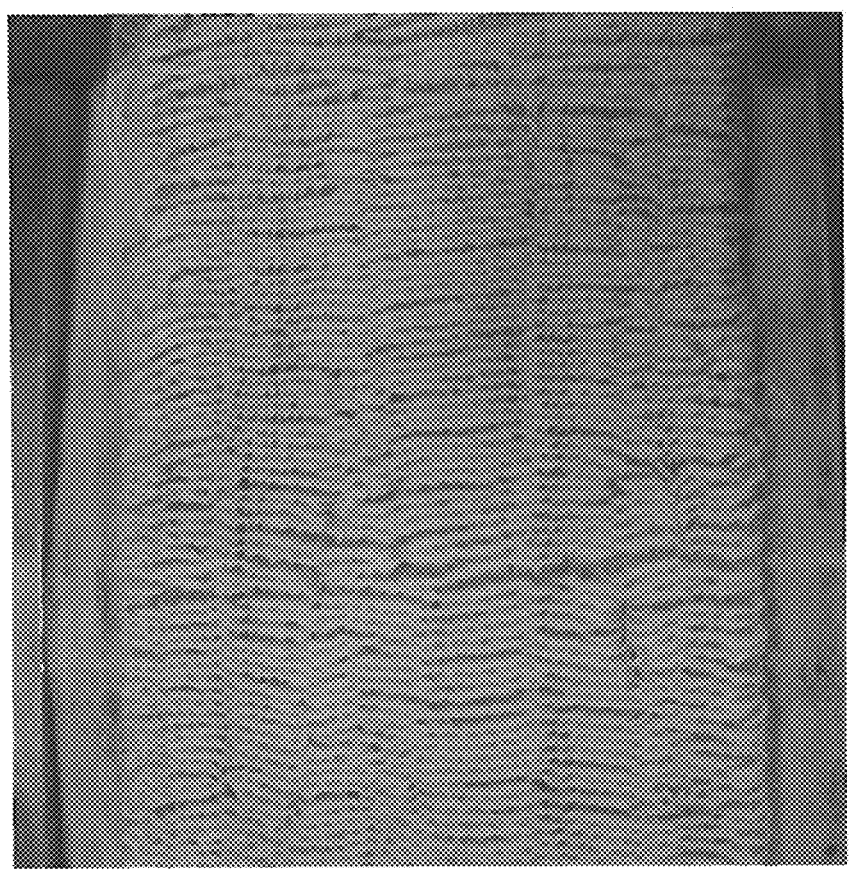
FIG. 11 is a photograph showing the noodle strings on the conveyor in the arranging step of Conventional Example.
Figure 1:
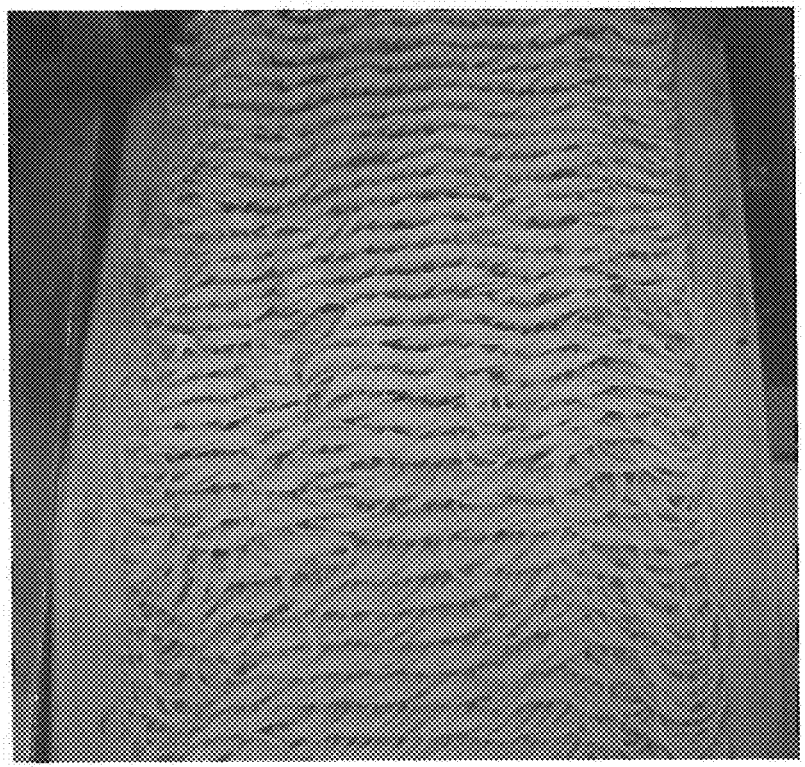
Figure 1:
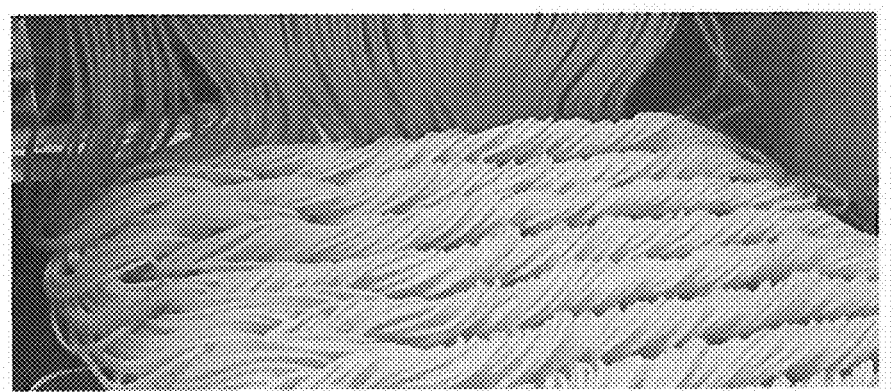

Next, the stack state of the noodle strings on the conveyor in the arranging step of Conventional Example is shown in FIG. 11. In Conventional Example, the noodle strings were stacked on the conveyor such that adjacent noodle strings were in the parallel state, narrowly curved, and linearly overlapped one another in the proceeding direction of the conveyor. The contact portions where the noodle strings contact each other were large.

Next, the stack state of the noodle strings on the conveyor in the arranging step of Comparative Example is shown in each of FIGS. 12 and 13. In Comparative Example, the noodle strings were stacked on the conveyor such that adjacent noodle strings were in the parallel state, and the flows of adjacent noodle strings were in synchronization with each other for the most part of the stack state of the noodle strings. The contact portions where the noodle strings contact each other were very large. The noodle strings were stacked such that adjacent noodle strings form a mass while curving on the conveyor.

<States of Noodle Strings when Cooked with Hot Water>

Figure 14:
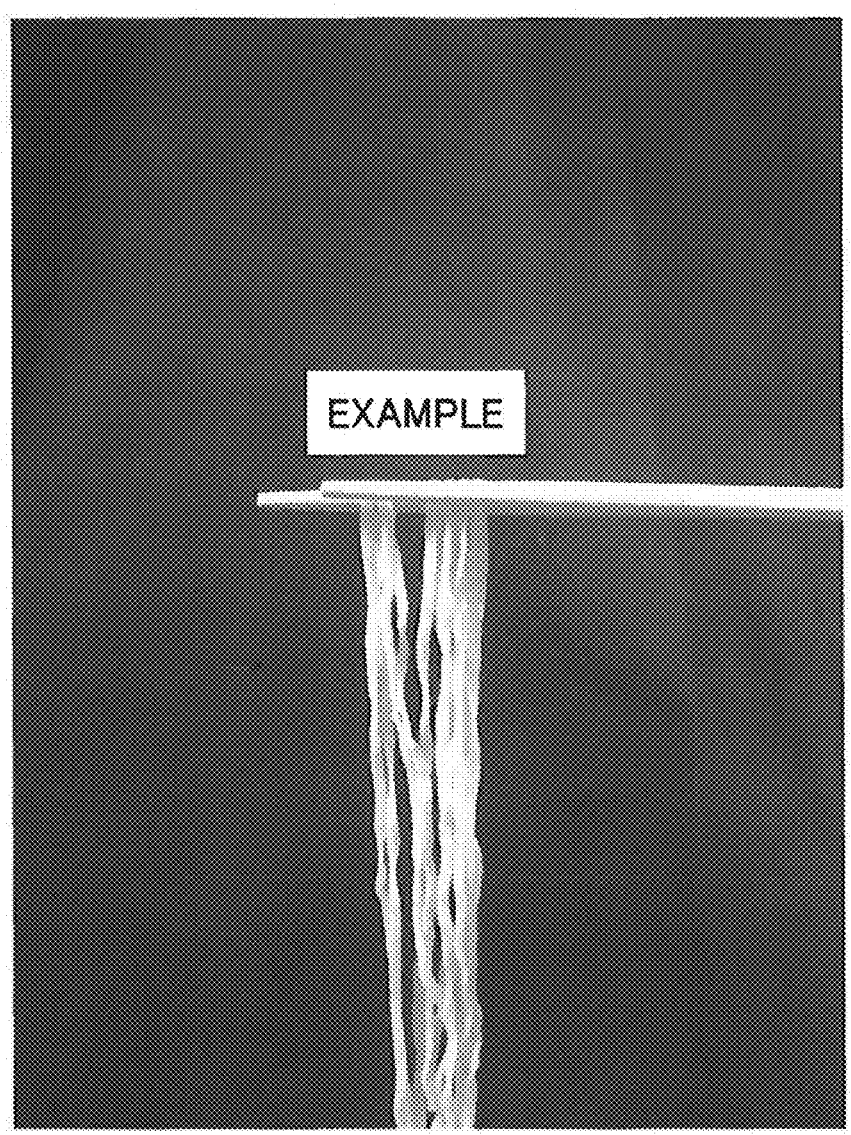
FIG. 14 is a photograph showing the noodle strings of Example when the noodle strings are cooked with hot water.

An experiment was carried out, in which 70 grams of the noodle strings (fried noodles) obtained after the drying step of Example were immersed in 400 mL of hot water for three minutes. The states of the noodle strings cooked with hot water are shown in FIG. 14. The noodle strings of Example could be stretched linearly when the noodle strings were picked up with chopsticks or the like. Thus, the noodle strings of Example were the straight noodles. The noodle strings did not stick to one another.

Even in a case where a drying step of carrying out a hot air drying treatment was carried out instead of the drying step of Example, the states of the noodle strings cooked with hot water were the same as above.

Figure 15:
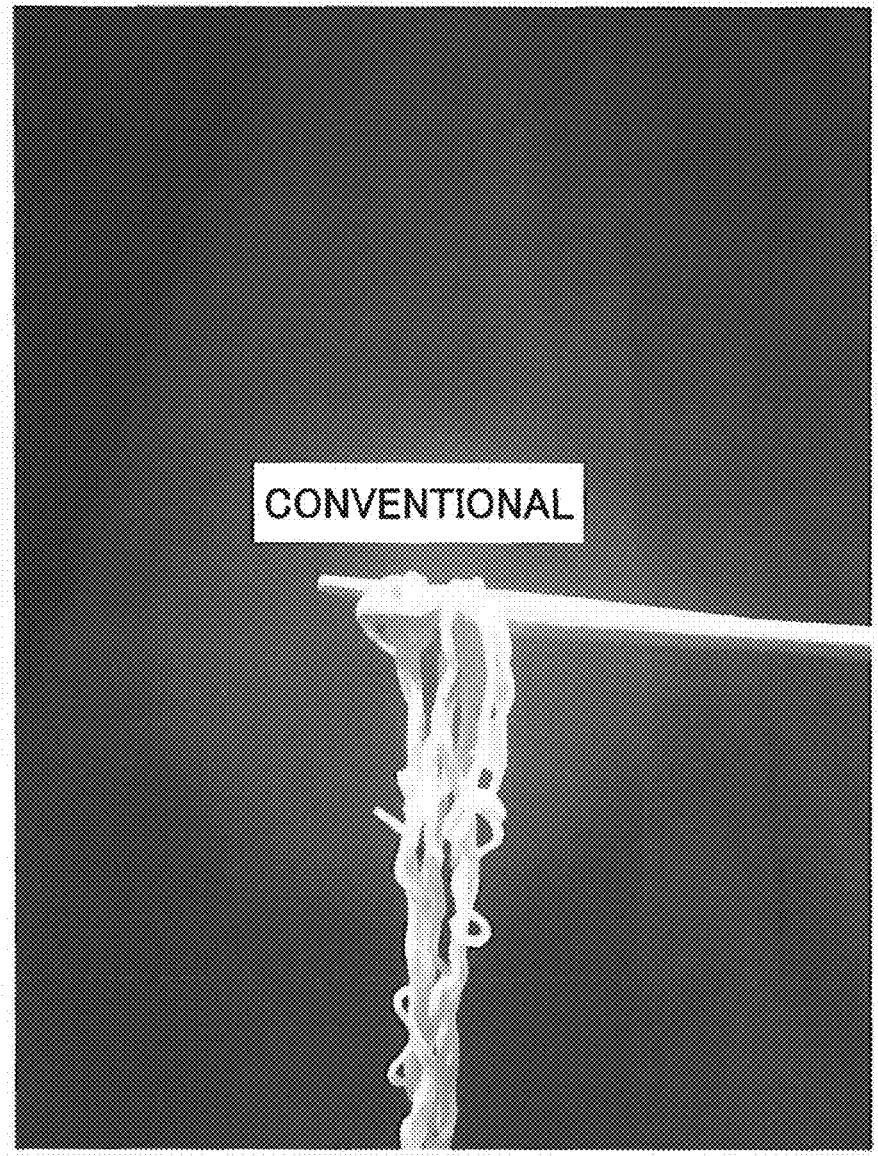
FIG. 15 is a photograph showing the noodle strings of Conventional Example when the noodle strings are cooked with hot water.

Next, an experiment was carried out, in which 70 grams of the noodle strings (fried noodles) obtained after the drying step of Conventional Example were immersed in 400 mL of hot water for three minutes. The states of the noodle strings cooked with hot water are shown in FIG. 15. The noodle strings of Conventional Example had strong waves and could not be stretched linearly when the noodle strings were picked up with chopsticks. Thus, the noodle strings of Conventional Example were not the straight noodles.

Figure 16:
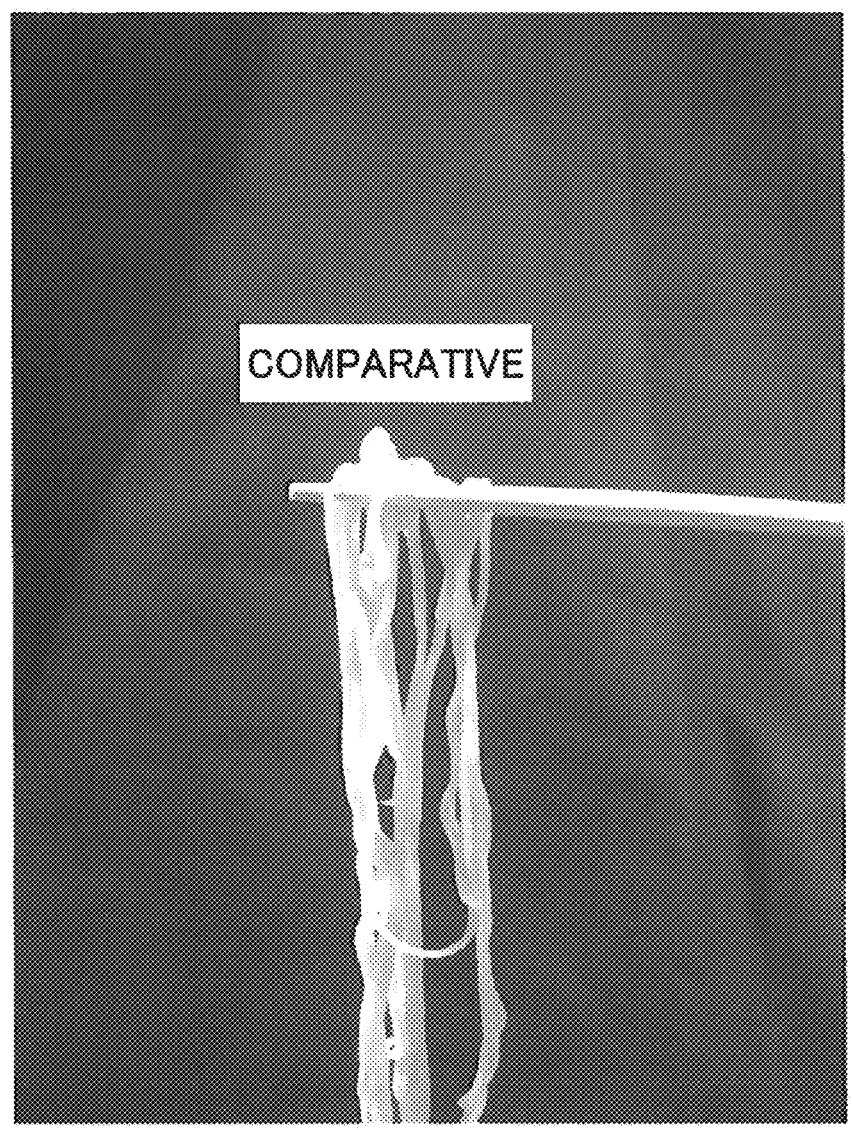
FIG. 16 is a photograph showing the noodle strings of Comparative Example when the noodle strings are cooked with hot water.

Next, an experiment was carried out, in which 70 grams of the noodle strings (fried noodles) obtained after the drying step of Comparative Example were immersed in 400 mL of hot water for three minutes. The states of the noodle strings cooked with hot water are shown in FIG. 16. Since the noodle strings of Comparative Example stick to one another more than Conventional Example, the noodle strings could not be stretched linearly when the noodle strings were picked up with chopsticks. Thus, the noodle strings of Comparative Example were not the straight noodles.

Figure 17:
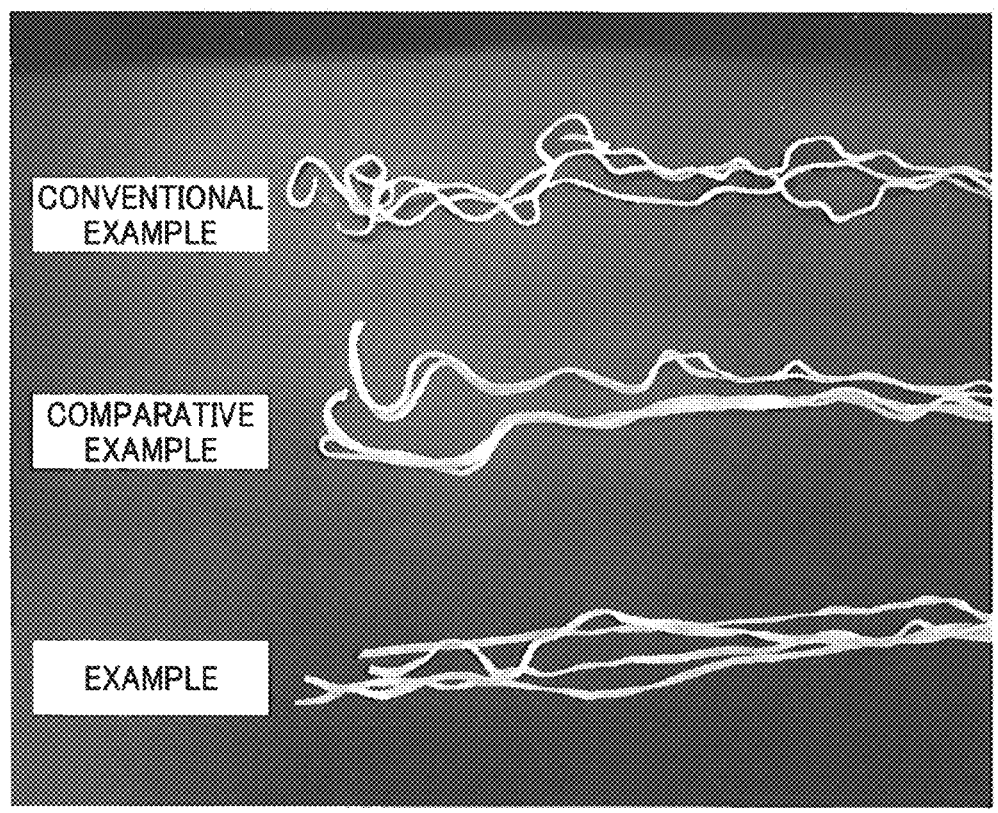
FIG. 17 is a photograph showing that the noodle strings of Example, Conventional Example, and Comparative Example when the noodle strings are cooked with hot water are placed on a horizontal plate.

The noodle strings of Example, Conventional Example, and Comparative Example were cooked with hot water, picked up with chopsticks, and placed on the horizontal plate. A photograph showing these noodle strings taken from above is shown in FIG. 17. In Conventional Example, since each noodle string had waves, it was not the straight noodle. In Comparative Example, each noodle string was less wavy, but the noodle strings strongly stuck to one another for the most part.

In contrast, in Example, each noodle string did not have waves, and a portion where the noodle strings stick to one another was not confirmed.

From the foregoing explanation, many modifications and other embodiments of the present invention are obvious to one skilled in the art. Therefore, the foregoing explanation should be interpreted only as an example, and is provided for the purpose of teaching the best mode for carrying out the present invention to one skilled in the art. The structures and/or functional details may be substantially modified within the spirit of the present invention.

INDUSTRIAL APPLICABILITY

Bunchy fresh noodles used as instant noodles according to the present invention are useful in the food field.

REFERENCE SIGNS LIST

1: scraper
2a, 2b: separating tooth
3a, 3b: tip end portion of separating tooth
4: a pair of cutting blade rolls
4a, 4b: cutting blade roll
5: conveyor
6: conveyor roll
7: zigzag noodle string
8: noodle string having substantially spiral shape
9: upper plate
10: rotational center of cutting blade roll

The invention claimed is:

1. A process for making bunchy fresh noodles for preparing instant noodles having substantially linear strings when cooked with hot water,
    the bunchy fresh noodles forming a substantially flat bundle such that a plurality of noodle strings overlap one another, the process comprising steps of:
    (a) producing the fresh noodles by cutting from noodle dough by using a cutting tool; and
    (b) arranging the noodles on a conveyor in a direction which is away from the cutting tool, in such a manner that:
        (i) each of noodle strings forming the fresh noodles bends and repeatedly forms loops on the conveyor;
        (ii) the loops are arranged to be shifted on the conveyor as the conveyor moves;
        (iii) a trajectory of each noodle string is not in synchronization with a trajectory of the adjacent noodle string; and
        (iv) each noodle string intersects with and overlaps the adjacent noodle string such that positions of the loops of each noodle string are shifted from positions of the loops of the adjacent noodle string, wherein:
    in the step (b), the noodle strings fall onto the conveyor without using any guide means into which cut noodle strings are moved, thereby arranging each of noodle strings in the manner of (i)-(iv),
    the cutting tool includes a cutting blade roll having grooves and a scraper having separating teeth,
    a cutting speed by the cutting blade roll is in a range from five times to ten times a conveying speed of the conveyor, and
    when the noodle strings are separated from the grooves of the cutting blade, adjacent noodle strings contact the separating teeth of the scraper at different positions from each other in a circumferential direction of the cutting blade roll so that the noodle strings are separated at different positions, thereby arranging each of noodle strings bending and repeatedly forming loops on the conveyor, thereby arranging each of noodle strings in the manner of (i)-(iv).

2. The process for making bunchy fresh noodles according to claim 1, wherein
    plural loops of plural noodle strings are stacked over one loop of one noodle string on the conveyor.

3. A process for making bunchy fresh noodles for preparing instant noodles, the process comprising steps of:
    (a) cutting noodle dough by using a cutting tool into noodle strings; and
    (b) letting the cut noodle strings fall onto a conveyor without using any guide means into which cut noodle strings are moved, the conveyor conveying the fresh noodles in a direction away from the cutting tool, wherein:
    the cutting tool includes a cutting blade roll having grooves and a scraper having separating teeth, the separating teeth being located at different positions on an outer peripheral surface of a cutting blade roll, a cutting speed by the cutting blade roll is in a range from five times to ten times a conveying speed of the conveyor, when the noodle strings are separated from the grooves of the cutting blade, adjacent noodle strings contact the separating teeth of the scraper at different positions from each other in a circumferential direction of the cutting blade roll so that the noodle strings are separated at different positions, thereby arranging each of noodle strings bending and repeatedly forming loops on the conveyor, and after the noodle strings fall onto the conveyor, (i) each of noodle strings bends and repeatedly forms loops on the conveyor;

(ii) the loops are arranged to be shifted in a direction opposite the direction away from the cutting tool;

(iii) a trajectory of each noodle string is not in synchronization with a trajectory of the adjacent noodle string; and (iv) each noodle string intersects with and overlaps the adjacent noodle string such that positions of the loops of each noodle string are shifted from positions of the loops of the adjacent noodle string.

4. The process for making bunchy fresh noodles according to claim 3, wherein plural loops of plural noodle strings are stacked over one loop of one noodle string on the conveyor.

* * * * *